United States Patent [19]

Hultermans

[11] Patent Number: 5,410,627
[45] Date of Patent: Apr. 25, 1995

[54] METHOD OF FORMING AN OPTICAL CONNECTOR

[75] Inventor: Antonius P. C. M. Hultermans, Am Tilburg, Netherlands

[73] Assignee: The Whitaker Corporation, Wilmington, Del.

[21] Appl. No.: 168,279

[22] Filed: Dec. 6, 1993

Related U.S. Application Data

[63] Continuation of Ser. No. 875,571, Apr. 27, 1992, abandoned, which is a continuation of Ser. No. 675,609, Mar. 25, 1991, abandoned.

[30] Foreign Application Priority Data

Mar. 29, 1990 [GB] United Kingdom ............... 9007059
Mar. 29, 1990 [GB] United Kingdom ............... 9007060

[51] Int. Cl.⁶ .......................... G02B 6/00; G02B 6/36
[52] U.S. Cl. ............................................... 385/45
[58] Field of Search ............... 350/96.12, 96.15, 96.16, 350/96.17, 96.2, 96.21; 385/39, 44, 45, 51

[56] References Cited

U.S. PATENT DOCUMENTS

| | | | |
|---|---|---|---|
| 3,455,668 | 7/1969 | Upton | 350/96.15 X |
| 4,008,061 | 2/1977 | Ramsay | 350/96.15 X |
| 4,753,505 | 6/1988 | Mikami et al. | 350/96.12 X |
| 4,878,727 | 11/1989 | Boiarski et al. | 350/96.17 |
| 4,984,868 | 1/1991 | Ten Berge | 350/96.21 |
| 5,015,059 | 5/1991 | Booth et al. | 350/96.17 |
| 5,030,321 | 7/1991 | Coutandin et al. | 385/45 X |

*Primary Examiner*—Akm E. Ullah
*Attorney, Agent, or Firm*—Bruce J. Wolstoncroft; Eric J. Groen

[57] ABSTRACT

An optical connector (2) includes housing halves (4A) and (4B) having Y-shaped contours (6A, 6B, 8A, 8B) in the abutting faces of the housing halves (4A, 4B). A Y-shaped member (30) is inserted into the housing halves and sandwiched between the two housing halves. An optically transparent gel (20) is inserted into the housing adjacent to the end faces of the Y-piece, such that upon insertion of the optical fibers into the openings created by the Y-shaped contours, the unfinished fiber ends are in optical connection with the gel (20) and split into separate signals.

8 Claims, 3 Drawing Sheets

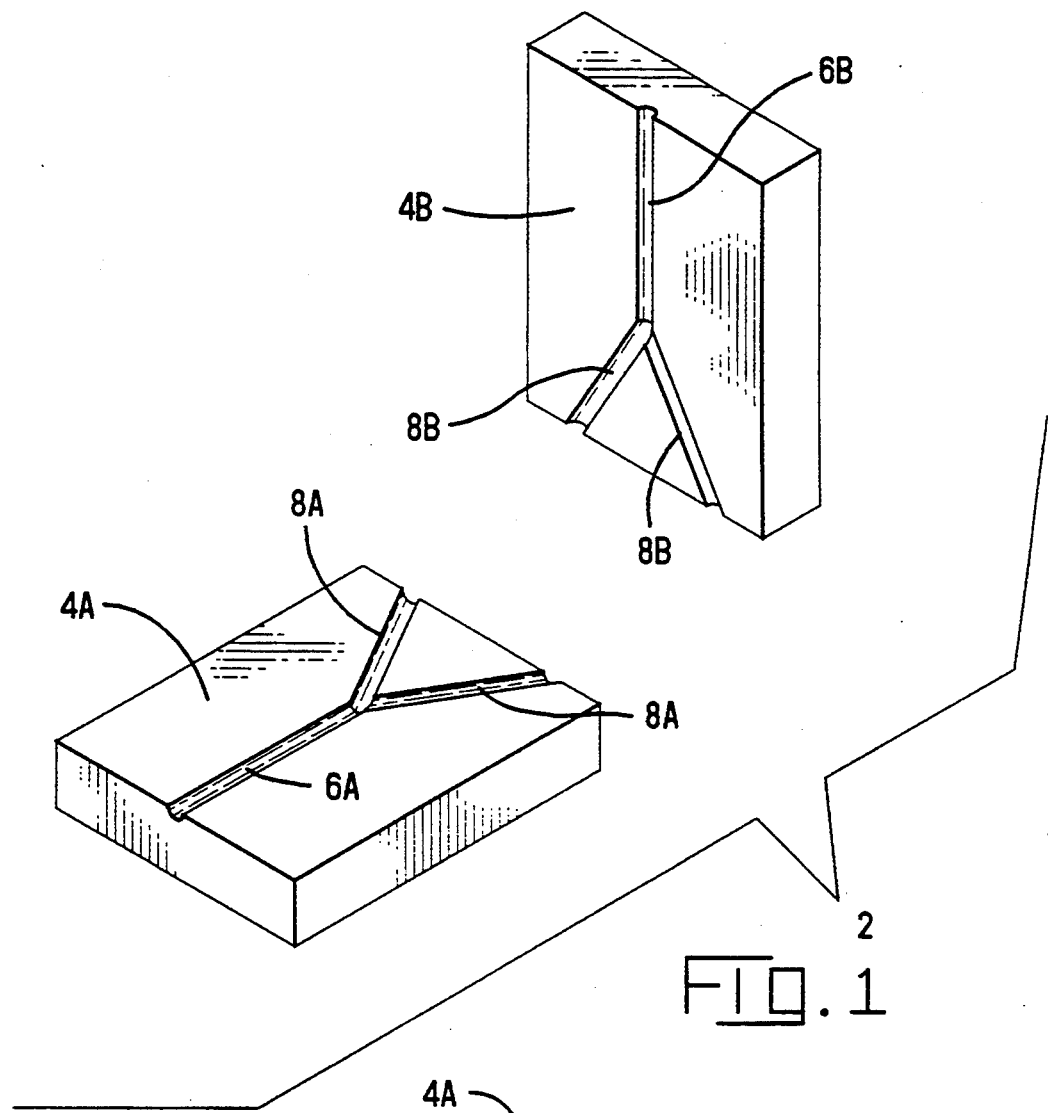
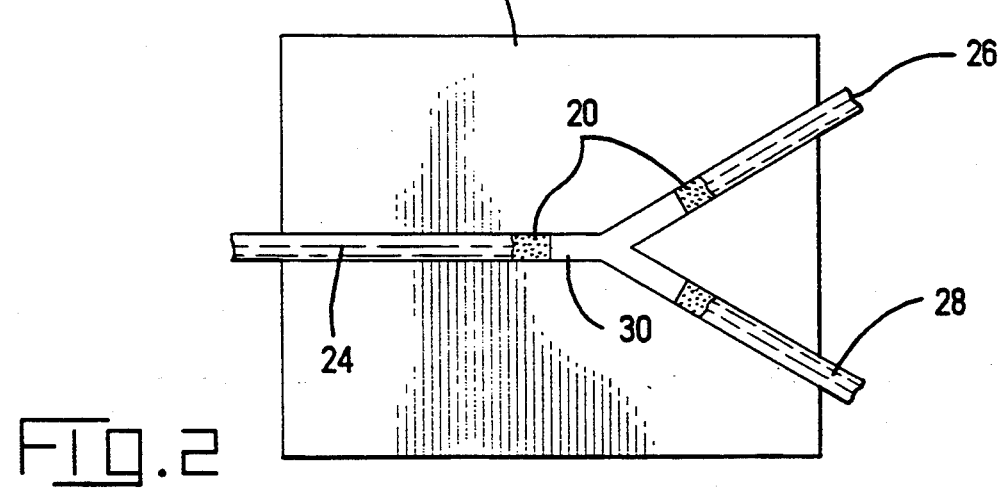

METHOD OF FORMING AN OPTICAL CONNECTOR

This application is a continuation of application Ser. No. 07/875,571 filed Apr. 27, 1992, now abandoned, which is a continuation of application Ser. No. 07/675,609 filed May 25, 1991, and now abandoned.

FIELD OF THE INVENTION

The subject invention relates to a fiber optic connector and a method for splicing or splitting fiber optic cables without the necessity of finishing the end of the fiber optic cable.

BACKGROUND OF THE INVENTION

Fiber optic cables are presently used in such areas as voice and data transmission in the computer and communications industries. While fiber optic cables are very efficient optically for such uses, leading to low signal losses through the cables, one of the present drawbacks to their use is the complexity of the field termination, that is splicing ends of fiber optic cables. It should be understood that fibers to be connected must be very precisely aligned in an abutting manner, without the presence of such discontinuities as gaps and the like between the end faces of the two fibers. A gap between two end faces causes reflection of the incident light due to the mismatch of the index between the two compounds. That is, air is present within the gaps and rough surfaces which can cause the scattering of the light and attenuation of the signal. Thus, this is the difficulty which presents itself in the field, the preparation of optical fibers for their abutting connection without the use of precisely controllable equipment. Presently, two methods of field termination of plastic core fiber optic cables are utilized.

The first method is to provide a plastic ferrule for insertion of a free end of a fiber optic cable therethrough. The fiber optic cable is glued to the inner periphery of the ferrule and the end of the cable has to be ground down to provide a smooth abutting surface for a similar free end of a mating fiber cable. It should be appreciated that the grinding process is not an easy one to control while in the field without a controlled environment, such as a manufacturing facility where tolerances can be kept to a minimum by the use of high quality machine tools.

A second method is similar to the first method except, rather than grinding the free end of the fiber optic cable, a hot plate is provided by the end user where the hot plate is abutted to the jagged edge of the free end to melt the free end of the fiber optic cable to provide a flat, smooth surface. This method is particularly difficult to carry out as the melting of the plastic fiber must be precisely controlled, otherwise the plastic fiber could be burnt, or damaged by a poorly aligned hot plate. Each of these methods is difficult to carry out in the field in that the surfaces of the fiber optic cables must be finished in a smooth manner and in a square manner relative to the length of the cable for abutment against a mating cable. As mentioned above, it is necessary for two abutting fiber optic cables to be as flush as possible to prevent an air gap between the two cables thereby presenting a difference in index of refraction between the two cables.

A further difficulty is presented where a fiber cable is to be split into two signals, a so-called fiber optic splitter, due to the angles at which the fibers are split, and which the fibers must be terminated.

A method of splitting optical fibers is shown in commonly assigned European Patent Publication Number 0 347 118A, published Dec. 20, 1989, where a splitter housing is formed with a Y-junction for receiving optical fibers. At the intersection of the Y, a gel is disposed which optically connects the fibers together. While the method shown in that patent is acceptable, it has been found that some attenuation is present due to the molding of the Y junction in the housing, between the two adjacent cables. Due to the inability to mold a precise "point" at that section, losses are created.

SUMMARY OF THE INVENTION

It is therefore an object of the invention to provide an optical connector where fiber optic cables with unfinished ends can be terminated within the connector, where the ends of the fibers need not be ground or otherwise polished.

It is a further object of the invention to provide an optical connector for use with unfinished free ends of fiber optic cables where the signal is separated into individual other signals, with minimum attenuation of the signals.

The above-mentioned objects are accomplished by providing a fiber optic connector where the connector comprises an optically isolating housing having a Y-shaped through bore. A one piece Y-piece is inserted in the Y-shaped bore and an optically transparent gel is disposed adjacent to the ends of the Y-piece. The gel and the Y-piece have an index of refraction equal to the index of refraction of the center core of the fiber.

While gels have been used for some applications to ensure interconnection between finished surfaces, for example see International Patent Application GB-87/00574, these gels have not been used for the interconnection of unfinished end faces.

BRIEF DESCRIPTION OF THE DRAWINGS

The preferred embodiment of the invention will now be described in view of the drawings in which:

FIG. 1 is an isometric view of the housing halves of a splitter connector system.

FIG. 2 is a top plan view of one of the housing halves showing the fiber optic cables and Y-piece in position.

DETAILED DESCRIPTION OF THE INVENTION

Figure 3:
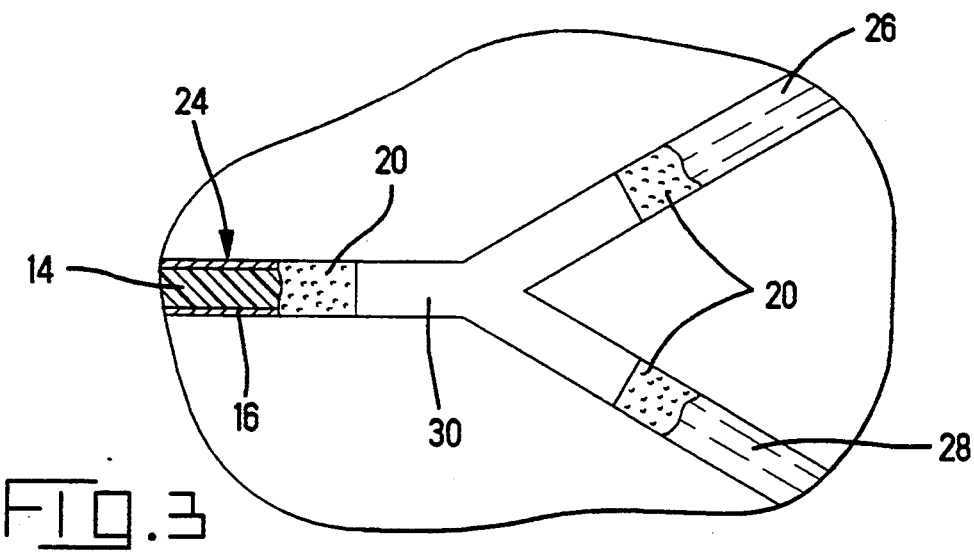
FIG. 3 is an enlarged view of the splice area.

With reference first to FIGS. 1 and 3, the connector is shown as a splitting mechanism for optical signals. Two housing halves are provided, such as 4A and 4B, with overlapping sections 6A and 8A which, when in position, define a through bore having a Y-shaped configuration.

With reference to FIG. 1, the optical connector housing halves are constructed of an optically isolating material, that is, non-transparent to light. With reference now to FIG. 2, the connector 2 further comprises fibers 24, 26 and 28 which include a plastic core 14 surrounded by a thin cladding material, such as 16. In the preferred embodiment of the invention, the center plastic core 14 is approximately 1000 mils in thickness, whereas the cladding which surrounds the plastic core is approximately 15-20 mils in thickness. Furthermore, in the preferred embodiment of the invention, the index of refraction of the center core portion is approximately 1.49 whereas the index of refraction of the cladding material is 1.42.

With reference still to FIG. 2, a gel material, such as 20, is included within the optical connector 2 which has an index of refraction substantially equal to that of the core 14, that is the index of refraction of the gel material is substantially equal to 1.49. Also, the index of refraction of the housing material should be equal to, or less than, that of the cladding, which in this case is approximately equal to 1.42. A fluoride plastic, PTFE, would be suitable for these purposes.

Also shown in FIG. 2 are further fiber optic cables 26 and 28 each having an inner core and an outer cladding substantially identical to the core and outer cladding of the first fiber 24 in the connector. It should be understood that the fibers 24, 26 and 28 are the fibers to be terminated in the field.

Figure 5:
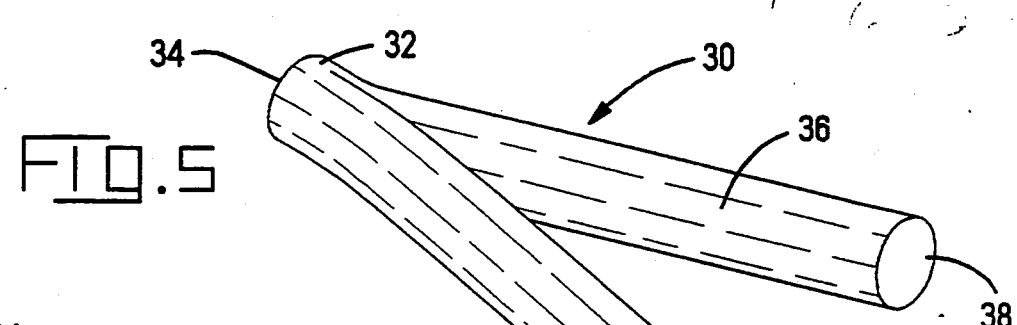
FIG. 5 is an isometric view of the preferred version of the Y-piece.

Finally, the optical connector 2 includes a Y-piece 30 having branch members 32 and 36 (FIG. 5) which cooperate to split the optical signal into two equal branch signals. This Y-piece would be a one piece prefabricated member which is placed in the optical connector housing halves 4A and 4B, with the gel material 20 adjacent to each branch end, as shown in FIG. 3. The inventive method would include the inclusion of the gel material such that the gel is situated within at least a portion of the Y configuration, as shown in FIG. 3, and the optical connector would be shipped to the end user in this configuration. In the preferred embodiment of the invention, the Y-piece is made of polymethyl methacrylate, which has an index of refraction substantially equal to that of the fiber core.

Figure 7:
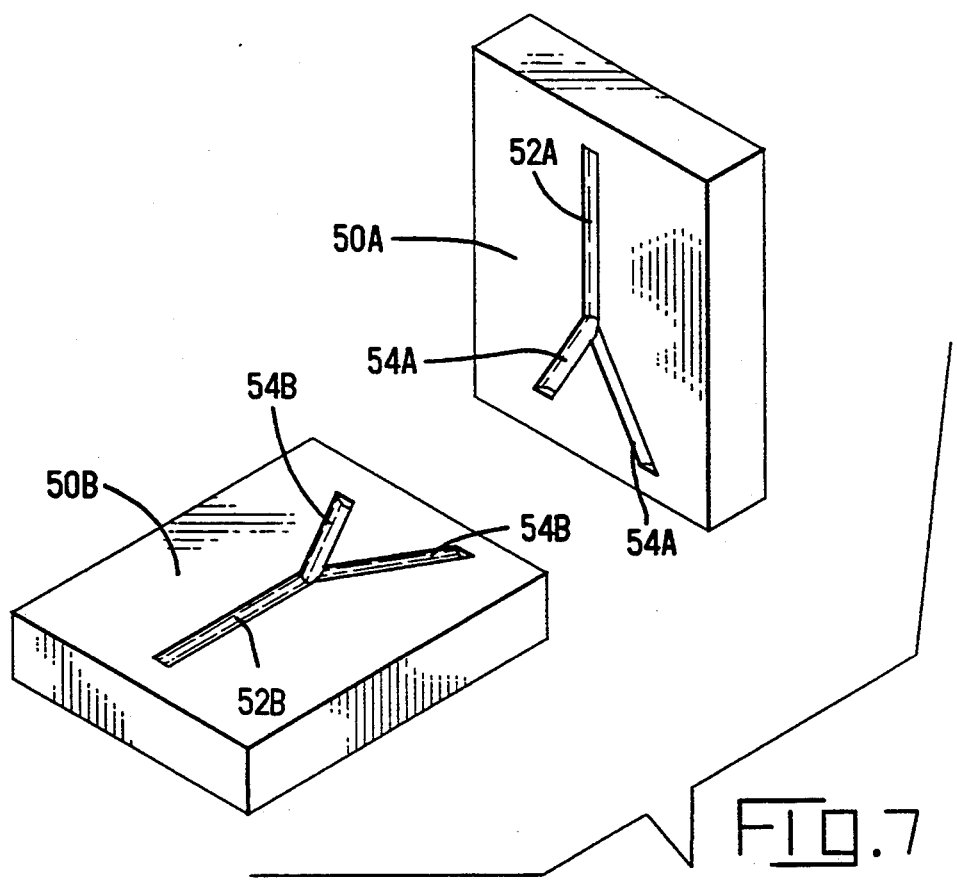
FIG. 7 is an isometric view of the dies which form the Y-piece of the optical connector.

With reference to FIG. 7, the Y-piece is formed by the die members 50A and 50B which are used to compress solid sheets of polymethyl methacrylate into the configuration shown in FIG. 3. Polymethyl Methacrylate is available in sheet form from the Rohm and Haas Company, under the tradename PLEXIGLAS, and from DuPont under the tradename LUCITE.

Figure 4:
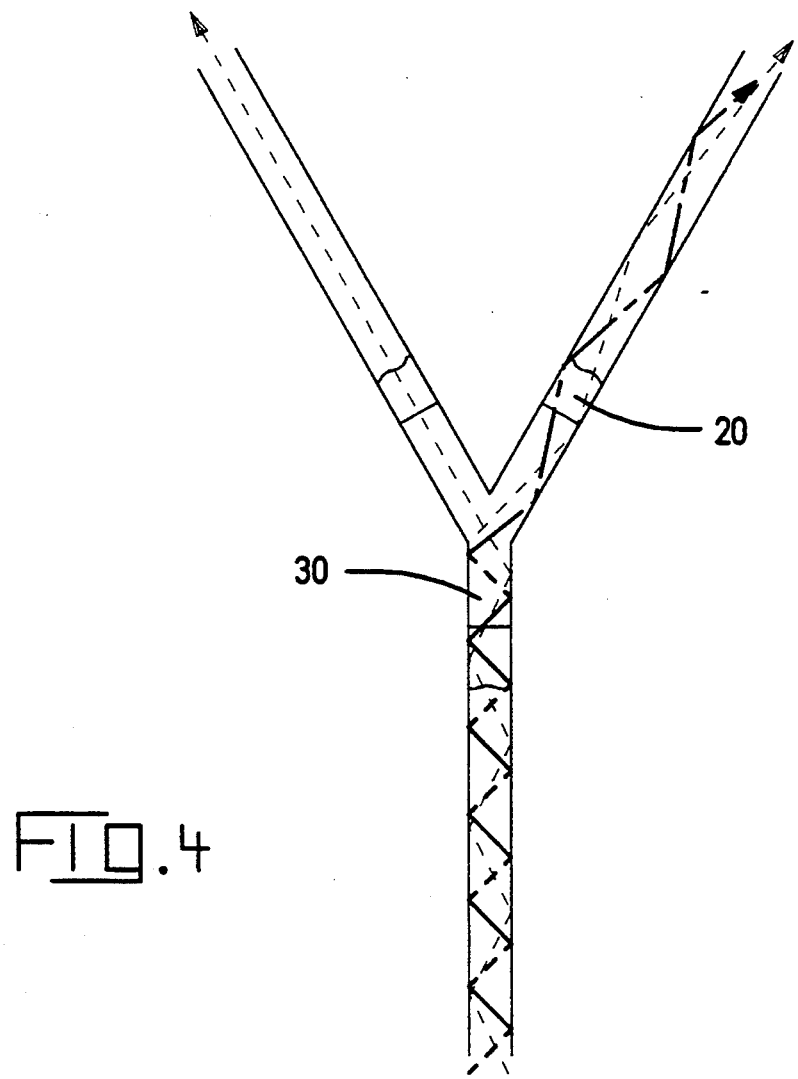
FIG. 4 is a diagrammatical view showing the reflection of the incident light within the splitter connection.

With the connector, as assembled in FIG. 3 in hand, the interconnection of the fibers 24, 26 and 28 includes only breaking respective ends of the fibers and inserting them into the bore created by overlapping sections 6A and 6B of the housing 4 and further into optical abutment with the gel 20. Full insertion of the fiber 24 into the gel 20 causes the gel, which is adjacent to the front face 34 of the Y-piece, to similarly conform to the front face of the fiber 24, as shown in FIG. 3. The splitting operation would of course continue with the insertion of the fibers 26 and 28 in a similar manner as that of fiber 24. With the connector 2 assembled as described above, and with the index match between the fiber core 14 and the gel 20, the light passes through the gel without refraction, as shown in FIG. 4; in other words, the reflection of the incident light is identical to that through a continuous length of fiber.

The advantages of the above-mentioned fiber optic connector should be appreciated to those skilled in the art. First, the fiber optic splitter housing is easily manufactured from conventional materials. Second, the installation of the second fiber 24 is simplified by the connector of the subject invention in that the forward ends of the fiber need not be polished in the field but merely can be broken in the field and inserted into the through bore of the connector and into optical connection with the gel 20.

Figure 6:
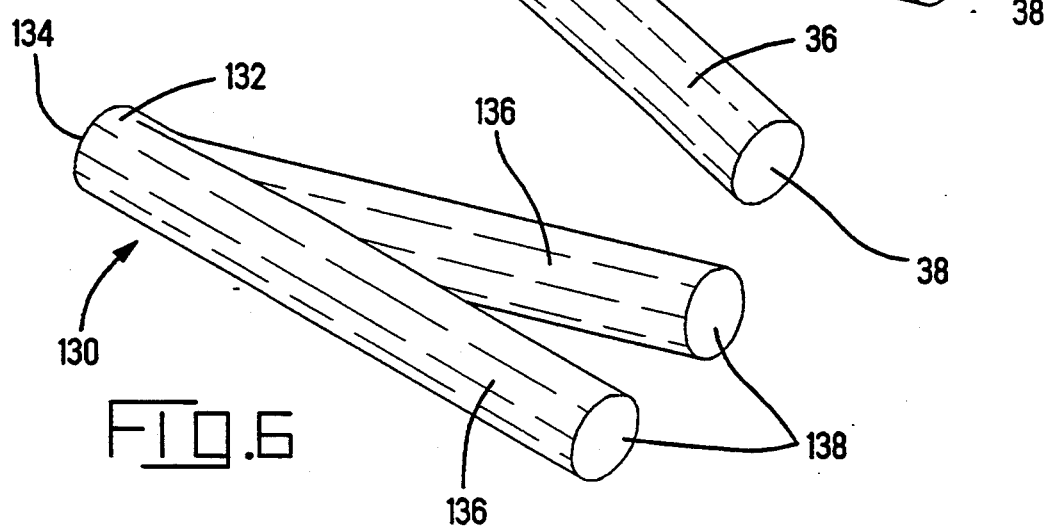
FIG. 6 is an isometric view of an alternate embodiment of Y-piece.

While the preferred embodiment of the invention relates to a splitter where the Y-piece splits the optical signal into two separate signals, an alternate version of the Y-piece is shown in FIG. 6 where the Y-piece 130 is a tap circuit which taps a portion of the optical signal through branch circuit 136, from the main branch circuit 132.

Changes in construction will occur to those skilled in the art and various apparently different modifications and embodiments may be made without departing from the scope of the invention. The matter set forth in the foregoing description and accompanying drawings is offered by way of illustration only.

I claim:

1. A fiber optic Y-coupler for optically connecting at least three fibers, comprising:
 a housing member having an optically opaque characteristic, said housing having a Y-shaped bore therein for receiving said fibers;
 a preformed one piece, non-viscous coupling member formed of an optically translucent material having three leg portions, an input leg portion and two output legs, disposed in said bore, each leg portion having an optical face for optical abutment of a fiber to be terminated with a viscous matching gel therebetween; and
 a cover member enclosing said housing member.

2. The fiber optic Y-coupler of claim 1, wherein said housing has a corner intermediate said two output Y-legs, and said output Y-legs extend beyond said corner.

3. The fiber optic Y-coupler of claim 1, wherein the diameter of the Y-coupler legs are substantially the same as the diameter of the fibers to be terminated.

4. A fiber optic Y-coupler for optically connecting at least three fibers, comprising:
 a housing member having an optically opaque characteristic, said housing having a Y-shaped bore therein for receiving said fibers;
 a preformed one piece coupling member, formed of a solid optically translucent material having three leg portions, an input leg portion and two output legs, is disposed in said bore, each leg portion having an optical face for optical abutment of a fiber to be terminated; and
 a gap is formed between at least one of said optical face portions of said coupling member and a fiber to be terminated, wherein said gap a deposit of a semi-solid, optically translucent matching gel is placed.

5. The fiber optic Y-coupler of claim 4, wherein said housing has a corner intermediate said two output Y-legs, and said output Y-legs extend beyond said corner.

6. The fiber optic Y-coupler of claim 4, wherein at least one other of said optical faces and fibers to be terminated forms a gap for the deposit of an optically translucent matching gel.

7. The fiber optic Y-coupler of claim 4, wherein the diameter of the Y-coupler legs are substantially the same as the diameter of the fibers to be terminated.

8. The fiber optic Y-coupler of claim 4, wherein the solid, optically translucent material comprises Polymethyl Methacrylate.

* * * * *